US012756873B2

(12) United States Patent
Ickin et al.

(10) Patent No.: US 12,756,873 B2
(45) Date of Patent: Oct. 6, 2026

(54) METHOD AND APPARATUS FOR GENERATING AND PROCESSING VIDEO DATA

(71) Applicant: Telefonaktiebolaget LM Ericsson (publ), Stockholm (SE)

(72) Inventors: Selim Ickin, Stocksund (SE); David Lindero, Luleå (SE); Gunnar Heikkilä, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 18/022,647

(22) PCT Filed: Aug. 26, 2020

(86) PCT No.: PCT/EP2020/073838
§ 371 (c)(1),
(2) Date: Feb. 22, 2023

(87) PCT Pub. No.: WO2022/042831
PCT Pub. Date: Mar. 3, 2022

(65) Prior Publication Data
US 2023/0319321 A1 Oct. 5, 2023

(51) Int. Cl.
*H04N 19/94* (2014.01)
*H04N 19/154* (2014.01)
*H04N 19/172* (2014.01)

(52) U.S. Cl.
CPC ........... *H04N 19/94* (2014.11); *H04N 19/154* (2014.11); *H04N 19/172* (2014.11)

(58) Field of Classification Search
CPC .... H04N 19/94; H04N 19/154; H04N 19/172; H04N 19/89; H04N 21/6473;
(Continued)

(56) References Cited

U.S. PATENT DOCUMENTS 8,665,952 B1 * 3/2014 Grange .................. H04N 19/63 382/233
2014/0211860 A1 7/2014 Zhao et al.
(Continued)

FOREIGN PATENT DOCUMENTS

CN 108141587 A 6/2018
CN 110324721 A 10/2019
(Continued)

OTHER PUBLICATIONS

International Search Report and Written Opinion of the International Searching Authority for PCT International Application No. PCT/EP2020/073838 dated May 3, 2021.
(Continued)

*Primary Examiner* — Juan M Guillermety
(74) *Attorney, Agent, or Firm* — Sage Patent Group

(57) ABSTRACT

Embodiments disclosed herein relate to methods and apparatus for generating video frames when there is a change in the rate of received video data. In one embodiment there is provided a method of processing video data which comprises generating a video frame using received video data, encoding said video frame into a latent vector using an encoder part of a generative model, modifying the latent vector and decoding the modified latent vector using a decoder part of the generative model to generate a new video frame in response to determining a reduction in generating the video frames using the received video data.

25 Claims, 6 Drawing Sheets

(58) Field of Classification Search
CPC ........... H04N 19/587; H04N 21/44209; H04N 21/4425; G06N 3/044; G06N 3/045; G06N 3/047; G06N 3/08; G06V 10/993
See application file for complete search history.

(56) References Cited

U.S. PATENT DOCUMENTS

| | | | | |
|---|---|---|---|---|
| 2014/0362918 | A1* | 12/2014 | Bushell | H04N 19/587 375/240.15 |
| 2017/0105010 | A1 | 4/2017 | Wu et al. | |
| 2018/0101770 | A1* | 4/2018 | Tanaka | G06N 3/045 |
| 2019/0358541 | A1 | 11/2019 | Bronder et al. | |
| 2020/0007603 | A1 | 1/2020 | Lopez-Moreira | |
| 2020/0090069 | A1* | 3/2020 | Mandt | G06N 3/045 |
| 2020/0099954 | A1* | 3/2020 | Hemmer | H04N 19/597 |
| 2020/0128307 | A1* | 4/2020 | Li | H04N 19/174 |
| 2020/0151559 | A1* | 5/2020 | Karras | G06N 3/047 |
| 2020/0167258 | A1* | 5/2020 | Chattopadhyay | G06N 3/08 |
| 2020/0184316 | A1 | 6/2020 | Kavukcuoglu et al. | |
| 2020/0244969 | A1 | 7/2020 | Bhorkar | |
| 2020/0304804 | A1* | 9/2020 | Habibian | G06N 3/045 |
| 2021/0174072 | A1* | 6/2021 | Zhang | G06N 3/088 |
| 2021/0192684 | A1* | 6/2021 | Pardeshi | G06N 3/045 |

FOREIGN PATENT DOCUMENTS

| | | | |
|---|---|---|---|
| CN | 107454429 | B | 12/2019 |
| CN | 110612538 | A | 12/2019 |
| CN | 110662019 | A | 1/2020 |
| CN | 110889509 | A | 3/2020 |

OTHER PUBLICATIONS

Jacob Walker et al, "The Pose Knows: Video Forecasting by Generating Pose Futures", 2017 IEEE International Conference on Computer Vision (ICCV), IEEE, Oct. 22, 2017 (Oct. 22, 2017), pp. 3352-3361.

Jun-Ting Hsieh et al, "Learning to Decompose and Disentangle Representations for Video Prediction", arxiv.org, Cornell University Library, 201 Olin Library Cornell University Ithaca, NY 14853,Jun. 11, 2018 (Jun. 11, 2018), 14 pages.

Ryan Smith, "Nvidia Intros DLSS 2.0: Ditches Per-Game, Training, Adds Motion Vectors for Better Quality", https://www.anandtech.com/show/15648/nvidia-intros-dlss-20-adds-motion-vectors, Mar. 23, 2020, 7 pages.

Pablo Barrera et al., "Improving Audio Quality in Duo with WaveNetEQ", Google AI Blog, Apr. 1, 2020, 5 pages.

Saeed Shafiee Sabet, "Delay Sensitivity Classification: Towards a Deeper Understanding of the Influence of Delay on Cloud Gaming QoE", arXiv:2004.05609 Apr. 12, 2020, 6 pages.

Emilio Calvanese Strinati, "6G: The Next Frontier", arXiv:1901.03239v2 [cs.NI] May 16, 2019, 16 pages.

Ross T. Whitaker, "A Level-Set Approach to Image Blending", IEEE Transactions on Image Processing, vol. 9, No. 11, Nov. 2000, pp. 1849-1861.

Indian Office Action, Indian Patent Application No. 201317013808, mailed Jun. 3, 2025, 6 pages.

Office Action for Chinese Patent Application No. 202080103572.6 dated May 11, 2024, 11 pages.

* cited by examiner

METHOD AND APPARATUS FOR GENERATING AND PROCESSING VIDEO DATA

CROSS REFERENCE TO RELATED APPLICATION

This application is a 35 U.S.C. § 371 national stage application of PCT International Application No. PCT/EP2020/073838 filed on Aug. 26, 2020, the disclosure and content of which is incorporated by reference herein in its entirety.

TECHNICAL FIELD

Embodiments disclosed herein relate to methods and apparatus for generating video frames when there is a change in the rate of received video data.

BACKGROUND

Temporal disturbances in a video stream on smartphones, virtual reality (VR) headsets, smart glasses and other devices are potential influential factors that negatively impact the end user quality of experience (QoE). This is especially critical within the scope of augmented and virtual reality (AR/VR) applications due to the stressed requirements related to the MTP (Motion to Photon) time, that it the delay between a user action and this affecting the display. MTP can be as short as 10-20 ms for head-mounted displays (HMD) that are attached to the user head, and where the content being displayed on the device needs to be adapted to the head movements accordingly and almost instantaneously.

NVIDIA's DLSS (Deep Learning Super Sampling) 2.0 uses an image upscaling (e.g. from 1080p to 4K) algorithm. This uses artificial intelligence (AI) to improve image quality where the target applications are games. NVIDIA builds a single optimized generic neural network, allows them more upscaling options and using a fully synthetic training set for deep neural networks. This integrates real-time motion vector information and re-projects the prior frame. These motion vectors need to be provided by the game developers to NVIDIA's DLSS (Deep Learning Super Sampling) platform which targets the cases when there exists a prior frame already received at the device and improves the quality of the frame, by means of up-scaling the quality. This allows high image quality to be emulated even with reduced reception of video or image data due to poor connectivity or other issues causing temporal disturbances in the video stream.

There exist other solutions such as caching the content to be reused within a local content delivery network (CDN) and in the case of audio content generation using Recurrent Neural Networks as described in Sabet S., and Schmidt S., and Zadtootaghaj S., and Griwodz C., and Moller S., Delay Sensitivity Classification: Towards a Deeper Understanding of the Influence of Delay on Cloud Gaming QoE. Sabet https://arxiv.org/ftp/arxiv/papers/2004/2004.05609.pdf However, these approaches are only capable of handling brief temporary interruptions or degradations in content streams and require fast and complex just-in-time freeze handling mechanisms. What is needed is a mechanism that can handle temporal disruptions to content streams over longer durations.

SUMMARY

According to certain embodiments described herein there is provided a method of processing video data. The method comprises generating a video frame using received video data and encoding the video frame into a latent vector using an encoder part of a generative model in response to determining a reduction in generating the video frames using the received video data. The latent vector is modified and decoded using a decoder part of the generative model to generate a new video frame.

This allow video frames to continue to be generated even with significant interruption or degradation to a connection streaming the video. By avoiding video freezes and instead displaying synthetic or artificially generated video frames, the user's quality of experience is improved in real time video streaming in applications as diverse as multiplayer video games and AR.

According to certain embodiments described herein there is provided an apparatus for processing video data. The apparatus comprises a processor and memory which contains instructions executable the processor whereby the apparatus is operative to generate a video frame using received video data and encode the video frame into a latent vector using an encoder part of a generative model in response to determining a reduction in generating the video frames using the received video data. The latent vector is modified and decoded using a decoder part of the generative model to generate a new video frame.

According to certain embodiments described herein there is provided a method of processing video data. The method comprises receiving a video frame from a first device (640) and encoding the video frame into a latent vector using an encoder part of a first generative model, modifying the latent vector and decoding the modified latent vector using a decoder part of the first generative model to generate a new video frame. The video frame is forwarded to the first device.

According to certain embodiments described herein there is provided an apparatus for processing video data. The apparatus comprises a processor and memory which contains instructions executable the processor whereby the apparatus is operative to receive a video frame from a first device (640) and encode the video frame into a latent vector using an encoder part of a first generative model, modify the latent vector and decode the modified latent vector using a decoder part of the first generative model to generate a new video frame. The video frame is forwarded to the first device.

According to certain embodiments described herein there is provided a computer program comprising instructions which, when executed on a processor, causes the processor to carry out the methods described herein. The computer program may be stored on a non transitory computer readable media.

BRIEF DESCRIPTION OF DRAWINGS

For a better understanding of the embodiments of the present disclosure, and to show how it may be put into effect, reference will now be made, by way of example only, to the accompanying drawings, in which.

DESCRIPTION

Figure 1:
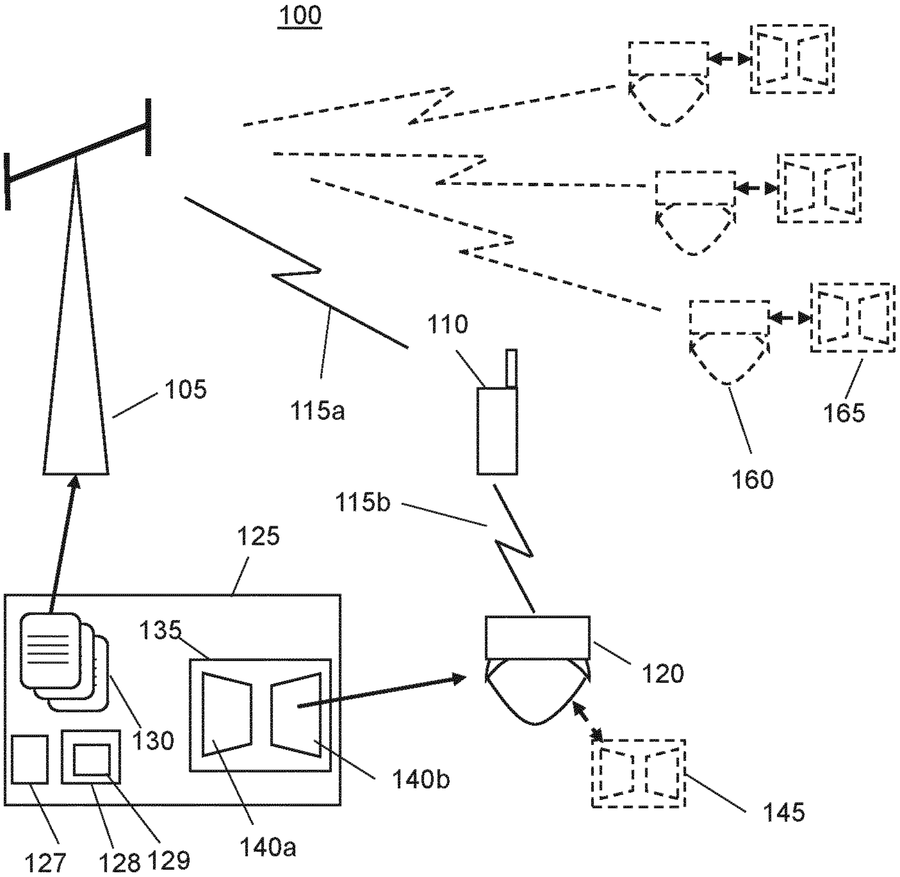
FIG. 1 is a schematic diagram illustrating a system for delivering video data according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions. Memory may be employed to storing temporary variables, holding and transfer of data between processes, non-volatile configuration settings, standard messaging formats and the like. Any suitable form of volatile memory and non-volatile storage may be employed including Random Access Memory (RAM) implemented as Metal Oxide Semiconductors (MOS) or Integrated Circuits (IC), and storage implemented as hard disk drives and flash memory.

Embodiments described herein relate to methods and apparatus for processing video data including handling interruptions to an incoming stream of video data used to generate video frames by generating new frames using a generative model such as a variational autoencoder (VAE). Video frames generated using the received video data may be represented as latent vectors in a latent space by encoding the video frames using an encoder part of the generative model. By modifying latent vectors representing video frames, a decoder part of the generative model may be used to generate new video frame by decoding the modified latent vectors.

This process may be triggered by an actual or predicted degradation in the generation of frames using received video data, for example due to issues with a connection over which the video data is received. However, in some embodiments latent vectors representing video frames generated using received data may be encoded and decoded, for example for continuous training of the generative model. A device employing this approach may ten switch to the artificially generated video frames, that is the video frames generated by modifying latent vectors, when a stream of video data is interrupted or degraded below a threshold.

FIG. 1 is a schematic diagram illustrating a system for delivering video or other content data according to an embodiment. The system 100 comprises a transmitter such as a Third Generation Partnership Project (3GPP) base station or a WiFi access point coupled by a wireless connection 115*a* to a receiver 110 such as a Smartphone which is coupled by a second wireless connection 115*b* such as Bluetooth™ to a head mounted display (HMD) or headset 120. Other headsets 160 may alternatively be directly connected to the transmitter 105. The headsets 120, 160 may be used to display video frames generated from video data received from the transmitter 105. Alternatively or additionally, other devices may be used to display video frames generated from video data received from the transmitter, for example Smartphones 110, larger non-head mounted display monitors or televisions, cameras or other display devices. Similarly, alternative connections may be employed such as wired, visible light communications, powerline or satellite.

Each headset 120, 160 or other device for generating the video frames is associated with a generative model 145, 165 such as a variational autoencoder. In some embodiments the video data may be received and used to generate video frames in an intermediate device 110 and the frames forwarded to a second device 120 in which case the intermediate device will be associated with the generative model.

A video or content server 125 coupled to the transmitter is arranged to deliver video data to the headsets 120, 160 or other devices 110 and may comprise a content library 130 comprising video data for video games, video programs and other video content which may be pre-recorded or generated by the server 125. Users of the video content may be able to interact with and alter the content, for example a user moving their headset 120 whilst viewing a video game may cause the video content to change as a result of the movement. The actions of other users playing in the same game may also cause the first user's video content to change.

The video server 125 also comprises a processor 127 and memory 128 containing instructions 129 to operate the server according to an embodiment. The server 125 may also comprise one or more generative models 135 each comprising an encoder 140*a* and a decoder 140*b*. The generative models 135 may be associated with respective users and/or video content such as respective games; and may be used to generate video frames. A generative model 135 may be used to generate video frames for a specific user which sends video frames to the server, or the generative model 135 may be forwarded to a user's device so that the user's device or headset 120 stores and uses the generative model 145 to generate video frames at the device. The generative models 135, 145 on the server or device will initially be pre-trained but may be further trained using video frames from the game or other content. For example, where the generative model is an autoencoder, the frames are encoded and decoded by the autoencoder, with the decoded frames being compared with the original frames to provide feedback for the autoencoder to continue improving its operation.

The device 110 or headset 120 receives video data in a stream having a data rate sufficient to enable generation of video frames for display at a certain resolution and frame rate. The connection(s) 115*a*, 115*b* between the transmitter 105 and device or headset 110, 120, 160 needs to provide sufficient bandwidth below a threshold latency to enable this. However, some connections such as certain wireless connections may be subject to degradation and even interruption which impacts on the video stream and may cause difficulty in generating the video frames. Some approaches to mitigating this include upscaling video frame images based on more limited video data, however such approaches can only accommodate limited degradation or brief interruption to the connection.

Embodiments allow video frames to continue to be generated even with significant interruption or degradation to the connection. This can be achieved using the generative models 135, 145, 165 as described in more detail below.

Figure 2:
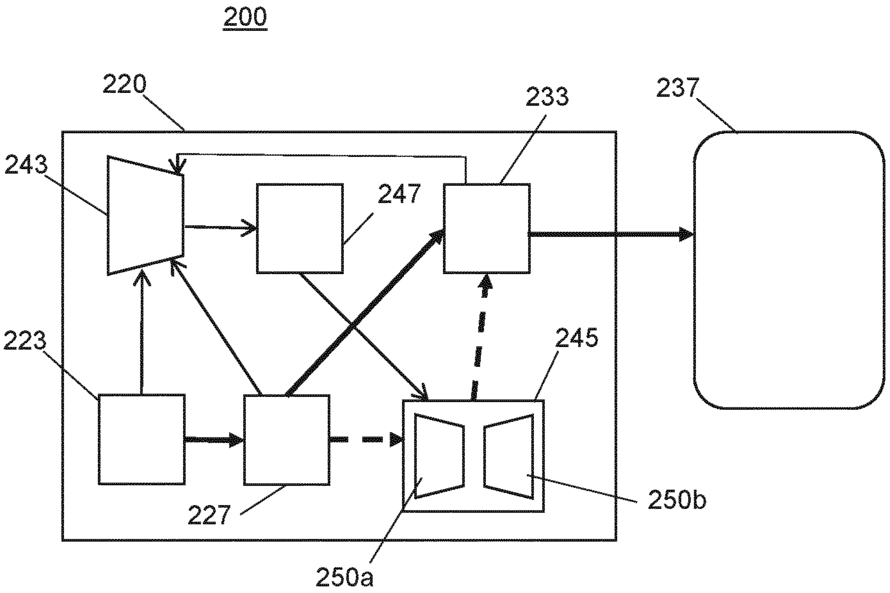
FIG. 2 is a schematic of an apparatus for receiving an processing video data according to some embodiments.

A schematic of an apparatus according to an embodiment is illustrated in FIG. 2 and may correspond with the device 110 or headsets 120, 160 of FIG. 1. The apparatus 200 comprises receiver 223 used to receive video data over a connection 115*a*, 115*b* and which is coupled to a video frame generator 227 which generates video frames using the received video data. The receiver 223 may be a 3GPP receiver such as LTE or 5G, a WiFi or Bluetooth receiver or any suitable circuit or software component. The video frame generator 227 may be an MPEG2/4 codec or any suitable circuit or software component. The video frame generator 227 is coupled to a display driver 233 which drives one or more display screens 237 to display the generated video frames to a user.

The receiver 220 also comprises a generative model 245 coupled to the video frame generator 227 as well as the display driver 233. The generative model 245 may be a model having convolution network as an encoder and a deconvolution network as a decoder, for example a variational autoencoder (VAE) having an encoder 250*a* and a decoder 250*b*. Other types of generative models may alternatively be used, for example Generative Adversarial Networks (GAN), Recurrent Neural Networks (RNN), Convolutional Neural Networks (CNN) and other types of Machine Learning. The generative model 245 may be used to generate synthetic video frames using the video frames generated by the video frame generator 227. The synthetic video frames may be forwarded to the display driver for display on the display screen 237.

The receiver 220 also comprises a circuitry and/or software 243 for determining a reduction in the generation of video frames using received video data. This may be determined using performance metrics of a connection used to receive the video data, for example received packet delay, received packet delay variation or jitter, signal strength, received throughput for example in bits per second and other known communications performance metrics; and may be provided by the receiver 223. Alternatively or additionally, such a situation may be determined by a reduction in performance metrics associated with generating the video frames such as inter-frame delay or the size of a time-gap between successive frames. In a further alternative, the inter-time gap or other performance metric associated with the display of consecutive frames on the display screen 237 may be monitored. These performance parameters may be monitored by the degradation detector 243 and if they move outside a threshold, a controller 247 is informed which switches from displaying video frames generated by the video frame generator 227 to video frames generated by the generative model 245. The degradation detector 243 may also predict a degradation in generating video frames, for example by predicting an increase in packet delay and/or video frame delay. If the detected/predicted inter-time gap or other metric is outside a threshold, for example 20 ms for VR/AR applications, then a switch to generating synthetic video frames is triggered.

The degradation detector 243 may be implemented as a supervised learning model. The supervised learning model may be pretrained. The supervised learning model may for example receive as input a time series of the inter-time gap between displayed frames. Various models may be adopted such as recurrent neural networks (RNN) such as a Long Short Term Memory (LSTM) network or using a Wavenet architecture and may implement Random Forest or other learning algorithms.

In an embodiment the input metrics to an inter-frame delay prediction model may be a time series of consecutive inter-frame time delay observed in the past until the time of the prediction or detection. The input metrics are fed into the model with a sliding window as defined in a Wavenet RNN, and the label is set to a discretized version of the value for the next timeslot based on the minimum required inter-frame time value. If the value is above the threshold it is set 0, and 1 otherwise. Once the model is trained on a number of devices, then it may be deployed on devices where the prediction/estimation model will start performing and running inferences.

In an embodiment, the input to a VAE model may be all possible video frames shown to user devices and is trained as follows. The input video frame is embedded into a matrix representation (M×N) and scaled, and then with a convolution network the model is compressed into a 3×1 representation of the image, where then a deconvolution network regenerates the image from a noisy (with some epsilon standard deviation) latent space. The loss in between the original and the regenerated video frames are then aimed to be minimized. The generative part of the model (e.g. VAE decoder) with the deconvolution network is extracted and deployed as the generator model, which then has the capability of regenerating an image from the latent space. The neighbors in the latent space represent images that are similar to each other and allows temporal continuity of video frames, since there is expected to be a high dependency in between consecutive frames. The next video frame can then be generated with a random or a more systematic walk (without jumping, and with continuity).

During the operation phase, the last displayed video frame will be converted to the latent representation using the pretrained VAE model, and then with a step-size of s, the random walk or other step algorithm at the latent space starts with a continuous pace and generates images with the deconvolution decoder model from the latent representation.

The various components 223, 243, 247, 227, 233, 245 of the apparatus 220 may implemented using a processor and memory containing processor instructions and the generative and/or predictive models 245, 243. However dedicated circuitry could be used for some of the components.

Figure 3:
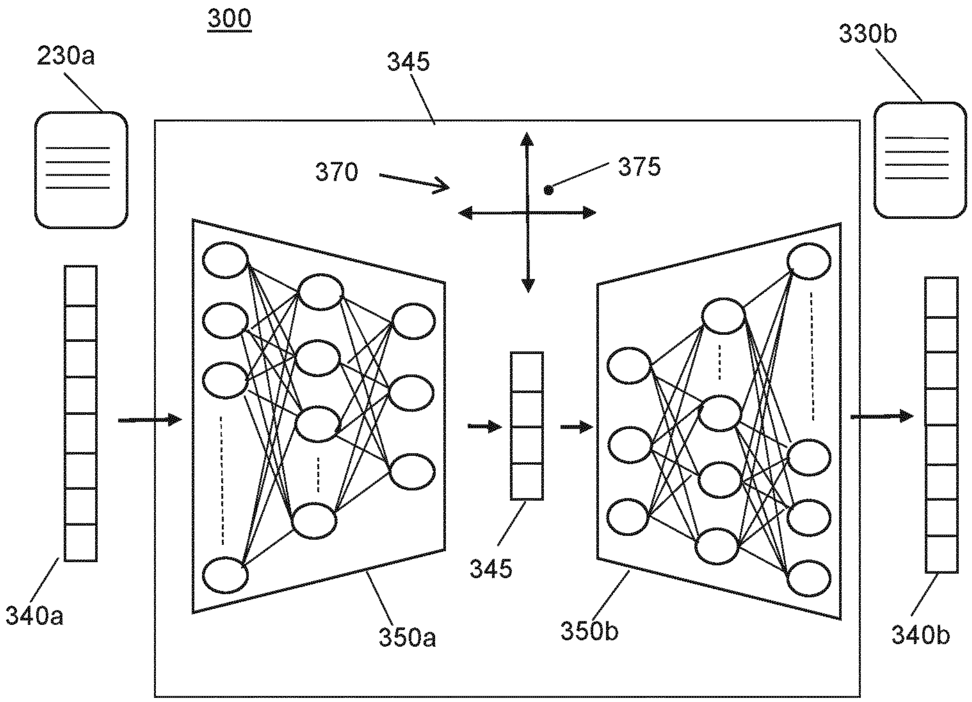
FIG. 3 is a schematic illustrating a generative model used to process video data according to an embodiment.

FIG. 3 illustrates a generative model according to an embodiment. The generative model 345 may be a variational autoencoder (VAE) comprising an encoder 350*a* and a decoder 350*b*. VAE are a conceptually similar to autoencoders which are artificial neural network that learns to copy its input to its output though conversion to and from corresponding latent variables. A VAE use a modified learning approach to constrain the distribution of latent variables. Changing these latent variables generates new outputs.

The encoder 350*a* comprises layers of perceptrons or other nodes including an input layer and hidden layers to translate an input into a coordinate 375 in a latent space 370 which may be represented by a latent vector 345. In this embodiment the input is a video frame 230*a* which may be represented by an input vector 340*a*. The dimensionality of the latent vector 345 is reduced compared with the input vector 340*a*. Whilst the latent space is shown as having only two dimensions for simplicity, it will be appreciated that there may be many more dimensions, although there will be less than that required for the video frames themselves.

The decoder 350*b* comprises layers of perceptrons, neurons or other nodes including hidden layers and an output layer to translate a coordinate 375 in latent space latent 370 into an output 330*b*. The output 330*b* may be represented by an output vector 340*b*. The output layer of the decoder has the same number of nodes as the input layer of the encoder 350*a* so that the input vector 340*a* and output vector 340*b* have the same dimensionality. By training the network 345, the output 330*b* becomes identical with or a close copy of the input 330*a*, with the latent coordinate for each input representing the input in the reduced dimensions of the latent space sufficiently well such that an output 330*b* closely resembling the input 230*a* can be extracted from the latent vector 345.

Once the VAE is sufficiently well trained, it may be used to generate outputs 330*b* which vary slightly from the inputs 230*a*. For example, where a stream of inputs 230*a* such as video frames stops, the VAE may be used to continue generating outputs 330*b* corresponding to synthetic video frames which vary from the last received video frame in such a way as to anticipate the original stream. This may be achieved by repositioning the coordinate 375 in latent space 370, in other words modifying the latent vector 345, and decoding the modified latent vector to generate a new video frame. By other changing the latent vector slightly, the generated video will only vary slightly from the last receive video frame. By making a sequence of changes to the latent vector, and corresponding sequence of video frames may be decoded as described in more detail below with respect to FIG. 4.

Figure 4:
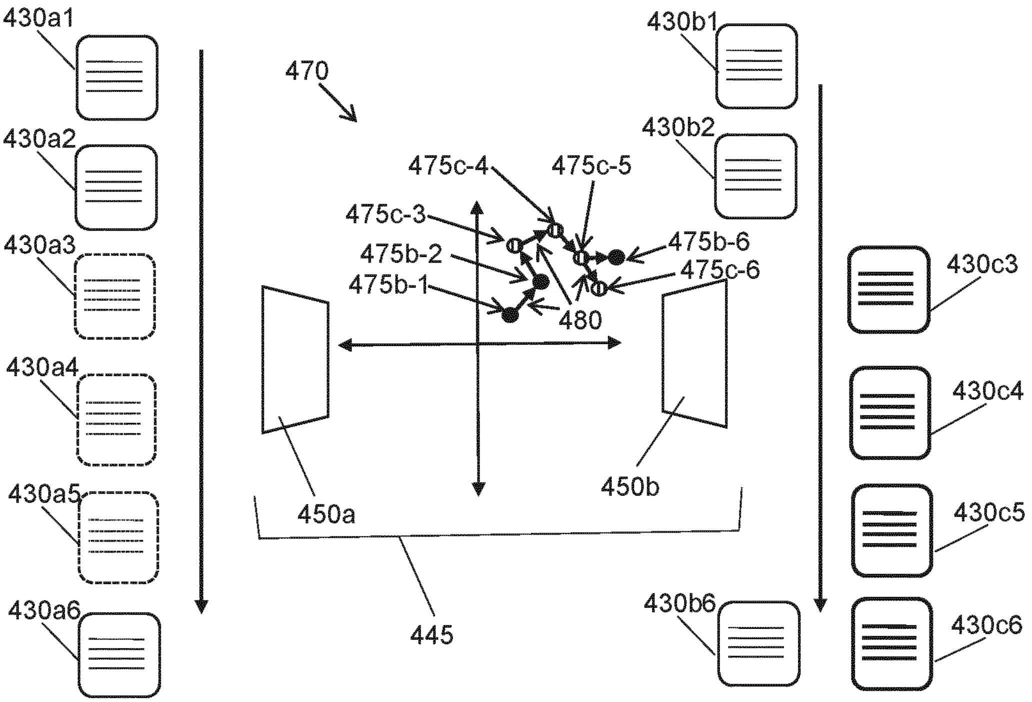
FIG. 4 is a schematic illustrating the generating of new video frames using the generative model of FIG. 3.

FIG. 4 illustrates generating new video frames using the generative model of FIG. 3. A video stream comprising video data may be associated with a sequence of video frames 430*a*1-6 that may be generated from the received video data or estimated using a generative model 445. Video frames 430*a*1-6 corresponding to the stream of video data are illustrated on the left are may be thought of as the original frames of a video game or video sequence which is forwarded to a device or apparatus for reproduction by the stream of video data. The first two video frames 430*a*1, 430*a*2 may be reproduced using the received video data to generate video frames 430*b*1, 430*b*2, for example using an MPEG4 coder or other known equipment or software. However, an interruption to the video data delivery channel, for example a loss of a wireless signal due to user movement, interference or other causes prevents the reproduction of further video frames 430*a*3-5 using this mechanism.

When this reduction in generating video frames using the received video data occurs, the generative model 445 is used to generate new video frames 430*c*3-430*c*6. The reduction in generating video frames using the received video data may be due to a complete loss of connection or reduced data rate or bandwidth such that there is insufficient information to generate the video frames using the received video data.

When sufficient video data is again received, a new video frame 430*b*6 corresponding to video data for video frame 430*a*6 may be generated again using the received video data. At this point, a corresponding video frame 430*c*6 may also be generated using the generative model 445. The video frame 430*b*6, 430*c*6 displayed may be switched back to that 430*b*6 generated using the received video data, or a combination of the two video frames 430*b*6 and 430*c*6 may be used.

The generative model 445 comprises an encoder 450*a* and a decoder 450*b*. When new video frames need to be generated using the generative model, the last generated video frame 430*b*2 is input to the encoder 450*a* to find a coordinate 475*b*-2 in the latent space 470 of the model. Alternatively other previously generated video frames 430*b*1 may be used, for example the last reference video frame generated using video data may be used, or where a system detects a change of scene at the point of interruption a stored reference frame corresponding to the new scene may be used.

Each coordinate 475*b*1-475*c*-6 may be represented by a latent vector in a computer processing system. The positional change in the coordinates, represented by changes in latent vector values, correspond to changes in the video frames they represent. For example, the change in position between coordinates 475*b*-1 and 475*b*-2 correspond to changes in the content of video frames 430*b*1 and 430*b*2. This may be a small change corresponding for example to a person moving slightly across a large static field. A large change may correspond to the entire scene panning from one type of landscape to another or even a completely new scene with no common visual elements compared with the previous scene. The positional change between coordinates is termed here a step 480 and may be any magnitude in any direction of a multi-dimensional space. As noted, the step size and direction will depend on changes in the visual elements of the corresponding video frames.

In order to generate a new video frame using the generative model 445, the coordinate 475*b*1 of the last used video frame 430*b*2 generated from the received video data is used as a starting point and a step is applied to find a new coordinate 475*c*-3. This new coordinate 475*c*-3 corresponds to a modification of latent vector of the previous video frame 430*b*2 and this modified latent vector is decoded by the decoder 450*b* to generate a new video frame 430*c*3. In a similar, additional steps may be applied to find subsequent new coordinates 475*c*-4, 475*c*-5 and 475*c*-6 which are decoded to generate video frames 430*c*4, 430*c*5, 430*c*6; each having changed video content compared with the previous frame depending on the positional change of their corresponding coordinate in latent space. Large steps sizes may result in significant changes in one or more aspects of the video content, dependent on the dimension(s) affected.

The size and/or direction of the step 480 used may depend on the application, for example a video game may use a random walk algorithm and may also be affected by markers of the game indicating changing scenes or events. An augmented reality (AR) application may use a system walk corresponding to continuing to move in the same direction on a factory tour where information about machinery is overlaid onto a display of the factory. A suitable algorithm for determining the steps may be determined experimentally. In some embodiments the size and/or direction of the step 480 may be dependent on the rate of change in a sequence of video frames 430*a*1, 430*a*2 prior to the reduction in generating the video frames using the received video data, and/or a prediction of future video frames.

When the video data is again received and available for generating video frames 430*a*6, the generating model 445 may continue to generate new video frames 430*c*6 at the same time as new video frames 430*b*6 are generated from the newly received video data. An apparatus using these two generation approaches may then switch from the VAE generated video frames 430*c*5 to the video frames 430*b*6, generated from the received video data, continue to use the VAE generated video frames 430*c*6 until the connection carrying the video data is deemed to be stable, or a combination of VAE generated 430*c*6 and video data generated 430*b*6 video frames may be used.

VAE generated video frames 430*c*6 and video data generated video frames 430*b*6 may be blended over time, for example initially weighting the VAE frames 430*c*6 more heavily and then increasing the weight of the video data generated frames 430*b*6. As can be seen in the latent space 470, the coordinate 475*c*-6 for VAE generated video frame 430*c*6 may be different from the coordinate 475*b*-6 for the video frame 430*b*6 generated from the newly recovered stream of video data. In this case, suddenly switching between the two may result in significant content change which may be unpleasant for a viewer/user and it may therefore be preferably to blend the images whilst slowly moving fully to video frames generated using received video data. Various algorithms for blending frames may be used, for example: Ross T. Whitaker, A Level-Set Approach to Image Blending, IEEE TRANSACTIONS ON IMAGE PROCESSING, VOL. 9, NO. 11, November 2000 1849

Figure 5:
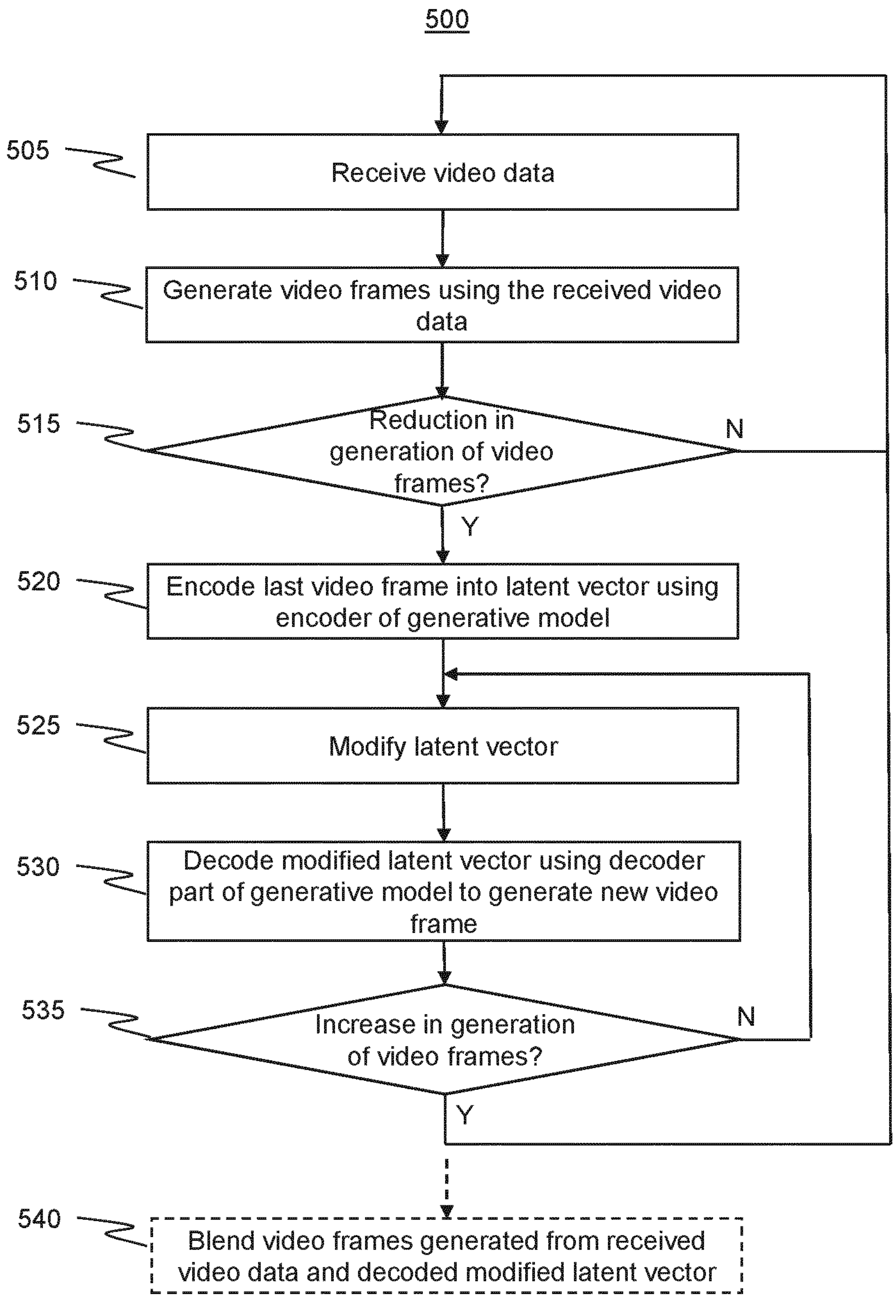
FIG. 5 is a flow chart of a method of processing video data according to an embodiment.

FIG. 5 is a flow chart of a method of processing video data according to an embodiment. The method 500 may be performed by a device such as a VR/AR headset, Smartphone or other display device including for example a device as described with respect to FIGS. 1-4. Parts of the method may be implemented on a server remote from the display device, as described in more detail below.

At 505, the method 500 receives video data such as MPEG2/4 compressed video frame representations. The video data may be received over a connection such as a wireless 3GPP or WiFi channel. The received video data may be for playing a video game which may be interactive with the received video data depending on user actions such as moving a headset display to change the view from within the game. The video data may also depend on the actions of other users playing the game. In another application the received video data may be used for AR, for example to display information about an item of machinery within a factory that the user is looking at.

At 510, the method generates video frames using the received data. The video frames may be generated using known circuitry and/or software, including for example MPEG decoders. The generated video frames may be displayed to a user of a headset or other display device.

At 515, the method 500 determines whether there is a reduction in the generation of video frames which may be due to a degradation in the connection used to deliver the video data. For example shadowing or interference of a wireless signal used to carry the video data may result in some video data not being received which may result in a reduction in the frame rate or resolution of video frame generation, or a complete interruption of video frame generation.

A reduction in generation of video frames may be determined based on detecting a predetermined change in connection metrics such as packet delay, packet delay variation, or jitter. Alternatively or additionally, a reduction in generation of video frames may be determined based on detecting a predetermined change in video quality assessment metrics such as inter-frame delay, for example the inter-time gap between displayed video frames, video bitrate, video frame rate and other metrics, for example those described in International Telecommunication Union (ITU) specification P.1204 *"Video quality assessment of streaming services over reliable transport for resolutions up to 4K"*.

Prediction algorithms based on these or other metrics may also or alternatively be used, including for example a machine learning based model. A reduction in generation of video frames may be determined by one or more of these metrics falling outside a threshold, and/or a corresponding output from the prediction model. In one example, this may correspond to a fall in quality score below 3 for the one of the outputs specified in ITU P.1204 (January 2020) section 7.3.

If there is no reduction in generation of video frames determined (515N), the method returns to 505, otherwise (515Y), the method 500 moves to 520. At 520, a previous video frame is encoded into a latent vector using the encoder of a generative model such as a VAE. The previous video frame may for example be the last video frame generated from the received video data. Whilst the video frame may be encoded in response to determining a reduction in generation of video frames such as a detected or predicted connection interruption, the video frames generated from the video data may have been encoded to latent space before this determination or event, for example to continue training the VAE by comparing decoded latent vectors with the video generated from the video data.

The last generated video frame or the video generated from the received video data and selected in response the determination in 515, has its corresponding latent vector modified at 525. This modification corresponds to the coordinate in latent space being changed or moved by a step. The size and direction of the step in latent space may be determined based on the application the video frame is being used for, and could include for example a random walk of random size and/or direction or a system walk of fixed size and/or direction. The modified latent vector corresponds to a change in visual components of the last used vied frame.

At 530, the method 500 decodes the modified latent vector using a decoder of the generative model, in order to generate a new video frame—that is a video frame generated by the generative model rather than the received video data, and what may be termed here a synthetic video frame. Further video frames may be generated by further modifying the latent vector and decoding this further modified latent vector.

Meanwhile, video frames may continue to be generated using received video data, albeit at a lower frame rate, if there is sufficient bandwidth and/or connection stability. Some of these video frames generated from the video data may be displayed to a user together with the synthetic video frames. The video frames generated from the video data may be interspersed with the synthetically generated video frames, or they may be blended. In a further arrangement, any video frames that can continue to be generated from the video data may be encoded and used to update the latent vector so that it tracks the intended trajectory of the video frames. New synthetic video frames may then be generated by modifying the updated latent vector by continuing to apply steps in the latent space. However in some situations, the connection may be insufficient to provide any or enough video data to generate video frames and in this case the generate model continues to generate new synthetic video frames by modifying the latent vector.

At 535, the method 500 determines whether there is increase in generation of video frames. This may be due to reestablishment of the connection carrying video data, or an increase in the rate of generating video frames using received video data above a threshold. If it is not determined that there has been an increase in generation of video frames using received video data (535N), the method 500 moves to 525 to again modify the latent vector. If however it has been determined that there is an increase in generation of video frames using received video data (535Y), the method 500 moves to 505 to again receive video data and generate video frames using this received video data.

The method may alternatively move to 540, where video frames generated using the generative model and those generated using the received video data are blended. This may avoid large discontinuities in the video frames displayed, so that initially the displayed image is based mostly on the synthetic video frames before slowing moving towards the video frames generated using the video data.

The method 500 may be implemented in a single device such as a VR headset or a Smartphone which performed the method and either displays the video frames on its onboard display screen or sends these to a separate display, for example a VR headset connected by Bluetooth™ or WiFi™.

Figure 6:
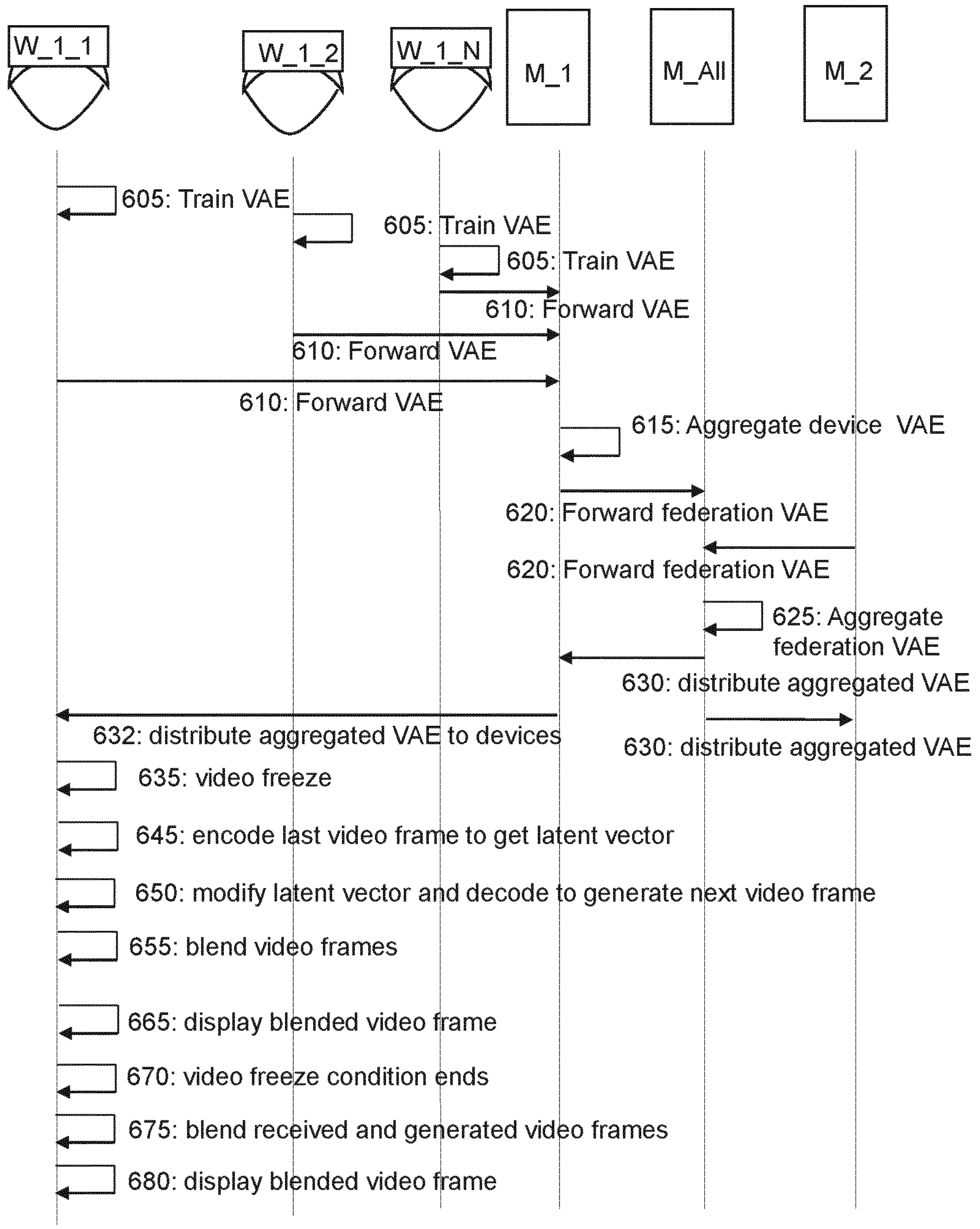
FIG. 6 is a flow diagram of signaling and events for a method of processing video data according to an embodiment.

In some embodiments, a device W_1_1 may cooperate with other devices W_1_2, W_1_N and/or servers M_1, M_2, M_All. FIG. 6 shows a flow diagram of signaling and events according to an embodiment. Device W_1_1 is a device such as a VR headset receiving video data corresponding to a multi-player game. Other devices W_1_2 and W_1_N belong to other players of the game which is streamed from server M_1 to each of the devices W_1_1, W_1_2, W_1_N. Whilst the players may all be in the same game environment, they may be in different locations and/or facing in different directions and so will receive respective video data from the server M_1. The devices W_1_1, W_1_2, W_1_N and server M_1 together form a federation which may use Federated Learning to improve the performance of generative models used within the federation and beyond.

Other federations playing the same game but amongst a different group of players and devices may have video data streamed from a different server M_2. The different server M_2 may be implemented on the same or different hardware as the first server M_1. A master server M_All may extend the Federated Learning approach by training generative model across a number of federations of the same or similar games. Federated learning is a machine learning technique used to train a model across multiple decentralized devices and/or servers without sharing local data. For example, weights used in VAE in individual devices of a federation may be shared with a server (e.g. M_1, M_2) which aggregates these according to known methods [Can you give an example or reference?] and shares the weights with the devices to update their VAE to provide improved learning compared with relying on their own received video data. Similarly aggregated weights from multiple federations may be shared with a master server M_All which further aggregates these and redistributes to the servers M_1, M_2 and in turn the devices W_1_1, W_1_2, W_1_N of each federation.

In this way the VAE used by each device to generate synthetic video frames is continuously trained using video data from a number of other devices, improving the generation of synthetic frames even for parts of a game which the device has not yet experienced (whereas other devices may have and their experience is leveraged to improve synthetic video generation for those parts of the game). Therefore, even for a complex game with many possible scenarios accurate synthetic video generation may be achieved rapidly by training the VAE encoder and decoder using received video data from a possibly large number of devices.

Referring to FIG. 6, at 605, each device W_1_1, W_1_2, W_1_N of a federation train their respective VAE or other generative model. This occurs when receiving generating video frames from received video data, the video frames may then be feed through the VAE where the video frames are encoded to latent space by an encoder part of the VAE and the resulting latent vector decoded by a decoder part of the VAE to generate video frames outputs which are compared with the input video frames and feedback given by known mechanisms to adjust the weights of the encoder and decoder.

At 610, the resulting VAE model or their weights are periodically forwarded from each device to the server M_1. At 615, the server aggregates the VAE models or weights according to known methods. A similar process may occur in other federations where devices (not shown) forward their models or model weights to their server M_2 which aggregates these.

At 620, the server M_1, M_2 for each federation sends aggregated VAE models or weights to a master server M_All which aggregates these at 625. The master server M_All then forwards the aggregated weights or VAE model to the federation server M_1, M_2 at 630. The federation servers then distribute the aggregated weights or VAE model to the devices in their federation at 632.

Referring now to device W_1_1, the device receives the updated weights or model and uses this for further processing of video data. This may include further training the VAE and repeating the above procedure periodically so that the VAE of the or a number of federations are continuously updated. At 635, the device determines whether there is a video freeze or stall detected or predicted. This is similar to the embodiment described with respect to FIG. 5 and be based on inter-frame delay or other parameters.

In response to this condition, at 645 the device gets the latent representation of the last video frame, for example by sending a stored video frame generated using received video data through the encoder of the VAE. At 650, a next video frame is generated by modifying the latent representation or vector and decoding this modified latent vector. At 655, the transition between the video frames generated using the received video data and the synthetic video frames generated by the VAE are smoothed or blended. At 665, the (blended) video frames are displayed to a user of the device, for example on a Smartphone screen or a VR headset.

At 670, the device determines that the freeze or stall condition no longer applies, for example because the original content stream has been received again. At 675, the video frames generated using the reestablished stream of video data are those generated by the VAE are blended or smoothed. The smoothed video frames are then displayed at 680.

Figure 7:
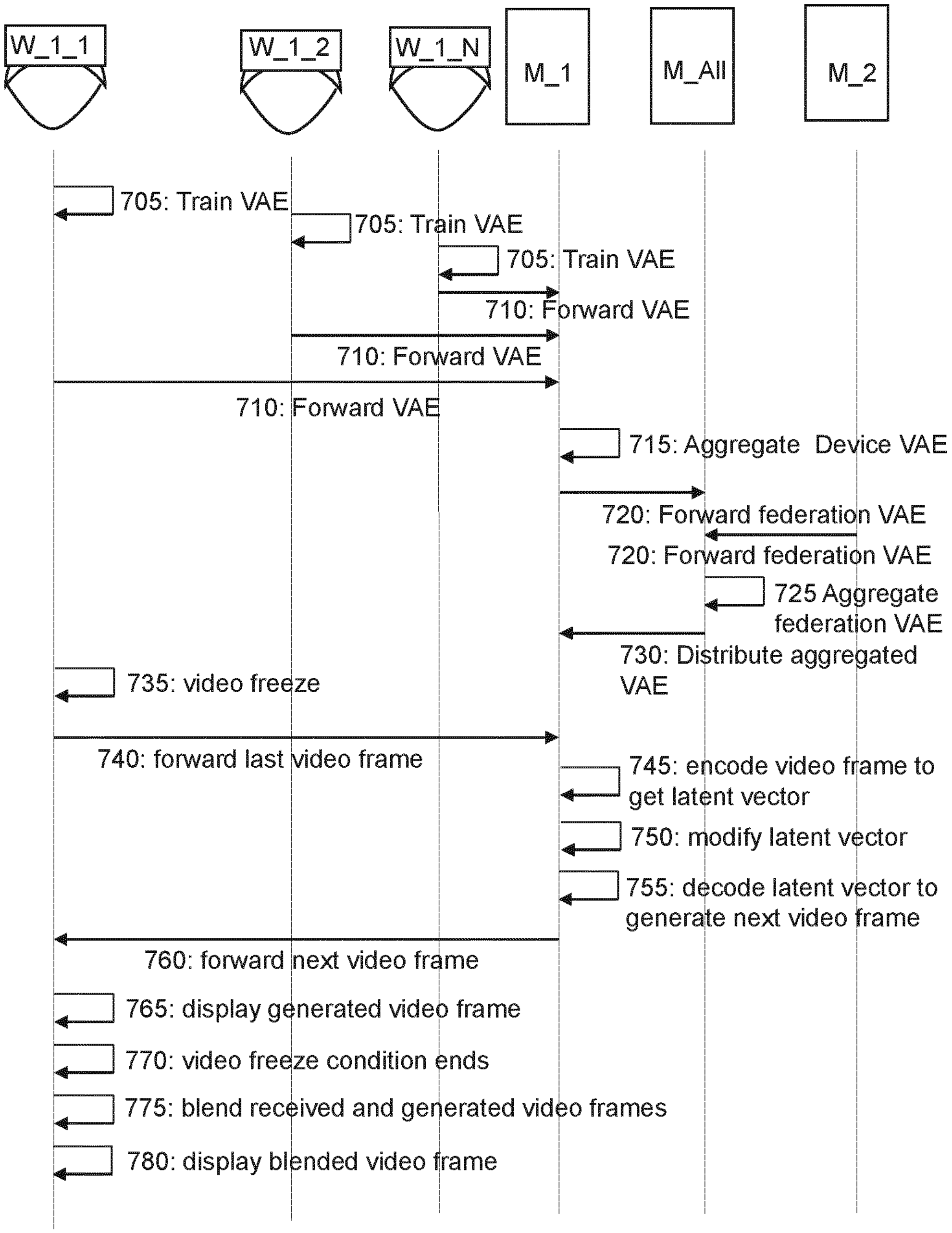
FIG. 7 is a flow diagram of signaling and events for a method of processing video data according to another embodiment.

FIG. 7 shows a flow diagram of signaling and events according to another embodiment in which the synthetic video frames are actually generated by the federation server M_1. As with the previous embodiment, at 705, each device W_1_1, W_1_2, W_1_N of a federation trains their respective VAE or other generative model. At 710, the resulting VAE model or their weights are periodically forwarded from each device to the server M_1. At 715, the server aggregates the VAE models or weights according to known methods. A similar process may occur in other federations where devices (not shown) forward their models or model weights to their server M_2 which aggregates these.

At 720, the server M_1, M_2 for each federation sends aggregated VAE models or weights to a master server M_All which aggregates these at 725. The master server M_All then forwards the aggregated weights or VAE model to the federation server M_1, M_2 at 730. However instead of then distribute the aggregated weights or VAE model to the devices in their federation, the server M_1 retains the updated VAE.

At 735, a device W_1_1 determines a video freeze condition and forwards its last generated video frame to the server M_1 at 740. At 745, the server then encodes the received last video frame from the device to a latent vector using the encoder of the updated VAE. At 750 the latent vector is modified as previously described and at 755 the modified latent vector is decoded by the decoder of the updated VAE to generate a next video frame. This and subsequent next video frames are forwarded to the device at 760.

At 765, the (blended) video frames are displayed to a user of the device, for example on a Smartphone screen or a VR headset. At 770, the device determines that the freeze or stall condition no longer applies. At 775, the video frames generated using the reestablished stream of video data and the synthetic video frames forwarded by the federation server are blended or smoothed. The smoothed video frames are then displayed at 780.

The embodiment of FIG. 7 has a lower computation load on the devices compared with the embodiment of FIG. 6; and may therefore be advantageous for more devise with more limited processing capacity. The embodiment of FIG. 6 has a lower computational load on the servers and reduced network traffic. The embodiment of FIG. 6 may also be advantageous where the video application's delay requirements are low and/or if the network link is costly. Further the embodiment of FIG. 6 is more privacy protected as the devices do not transmit the original video frames to the servers and so is less sensitive to intrusive attacks.

Figure 8:
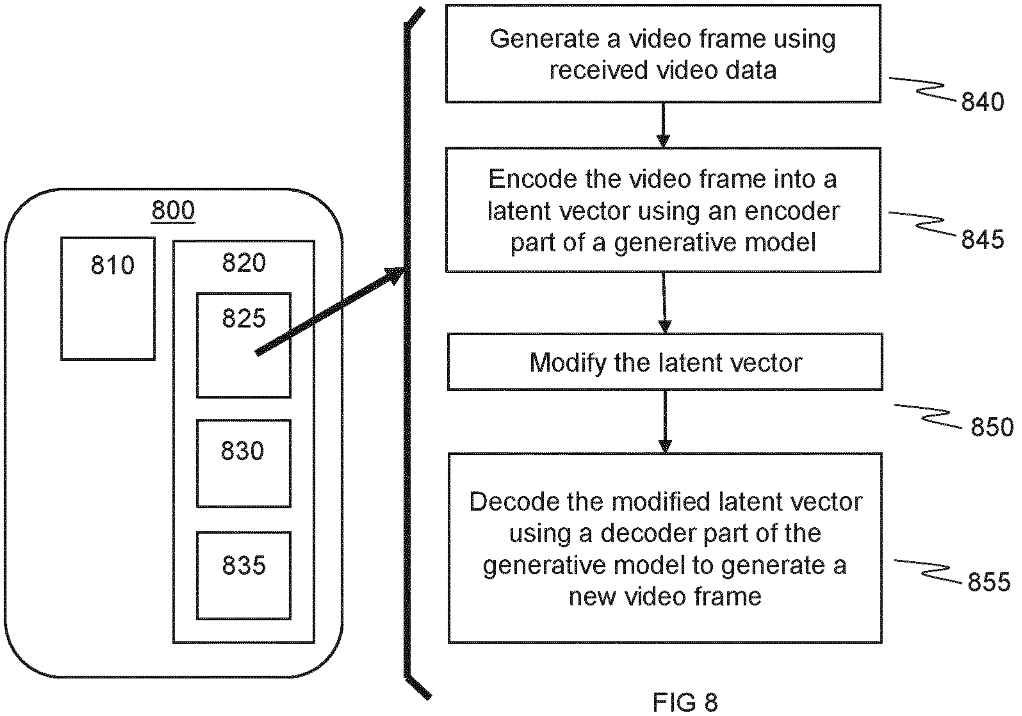
FIG. 8 is a schematic diagram illustrating the architecture of an apparatus according to an embodiment.

FIG. 8 is a schematic of a device which may be used to process video data according to embodiments. The device 800 comprises a processor 810, memory 820 containing computer program instructions 625 which when executed by the processor cause the processor to carry out methods of the embodiments. Example instructions are illustrated which may be executed by the processor 810. The device may include a generative model 830 such as a VAE used to generate synthetic video frames and a predictive model 835 used to detect or predict a video freeze event.

At 840, the processor 810 may generate a video frame using received video data, for example as previously described. At 845, the processor may encode the video frame into a latent vector using an encoder of the VAE 830. This may be responsive to a video freeze event predicted by the predictive model 835.

At 850, the processor 810 may modify the latent vector as previously described. At 855, the processor may decode the modified latent vector using a decoder part of the generative model 830 in order to generate a new video frame. The new or synthetic video frame may be used in place of video frames normally generated from received video but no longer available due to the video freeze event.

Embodiments may provide a number of advantages. For example by avoiding video freezes, and instead displaying video frames via just-in-time frame generation, the user's quality of experience (QoE) is improved in real time video streaming in applications as diverse as multiplayer video games and AR. Embodiments are also energy and bandwidth friendly as they do not overload the transmission links with too many consecutive packet request messages (also caused by re-transmissions), and instead can temporarily create their own content. The embodiments are able to accommodate long stalling events which may result for example from significant connection degradation and interruption. Some embodiments may utilize Federated Learning to accelerate and improve learning for the generative model to generate video frames with higher precision. Sensory information of the device may be collected continuously and processed such that the mapping between the right content at the right time is performed.

Whilst the embodiments are described with respect to processing video data, many other applications are possible including for example audio data or a combinations of video, audio and other streaming data.

Some or all of the described server functionality may be instantiated in cloud environments such as Docker, Kubenetes or Spark. Alternatively they may be implemented in dedicated hardware.

Modifications and other variants of the described embodiment(s) will come to mind to one skilled in the art having the benefit of the teachings presented in the foregoing descriptions and the associated drawings. Therefore, it is understood that the embodiment(s) is/are not limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method of processing video data, the method comprising:

generating a video frame using received video data;

encoding said video frame into a latent vector using an encoder part of a generative model in response to determining a reduction in the generation of video frames using the received video data, wherein the reduction is due to insufficient received video data to generate the video frames, wherein determining the reduction comprises detecting or predicting an inter-time gap between frames displayed on a display being above a threshold using an inter-frame delay prediction model;

modifying the latent vector to represent a temporally subsequent new video frame; and decoding the modified latent vector using a decoder part of the generative model to generate the new video frame.

2. The method of claim 1, wherein modifying the latent vector comprises moving a position corresponding to the latent vector in a latent space by a step for one or more new video frames.

3. The method of claim 2, wherein the size and/or direction of the step is dependent on one or more of the following: the rate of change in a sequence of video frames prior to the reduction in generating the video frames using the received video data; a prediction of future video frames; an application using the video data.

4. The method of claim 1, comprising switching from new video frames generated using the decoder part to video frames generated using received video data in response to determining an increase in generating the video frames using the received video data.

5. The method of claim 4, wherein the switching comprises blending the new video frames generated using the decoder part and video frames generated using received video data, with a weight of the video frames generated using received video data in the blending increasing over time.

6. The method of claim 1, comprising displaying the video frames using one or more of the following applications: video on demand; real-time video; gaming; artificial reality; or augmented reality.

7. A method of processing video data, the method comprising:

receiving a video frame from a first device and encoding the video frame into a latent vector using an encoder part of a first generative model in response to the first device determining a reduction in generating video frames using received video data, wherein the reduction is due to insufficient received video data to generate the video frames, wherein determining the reduction comprises detecting or predicting an inter-time gap between frames displayed on a display being above a threshold using an inter-frame delay prediction model;

modifying the latent vector to represent a temporally subsequent new video frame;

decoding the modified latent vector using a decoder part of the first generative model to generate the new video frame; and forwarding the new video frame to the first device.

8. The method of claim 7, comprising:

receiving second generative models from a plurality of devices, the second generative models having respective model weights and an encoder part and a decoder part; and aggregating the model weights to generate the first generative model.

9. The method of claim 8, wherein a second generative model is received from the first device and used to generate the first generative model.

10. The method of claim 7, comprising:

forwarding the first generative model to a server and receiving an updated first generative model from the server; and using the updated first generative model to encode the video frame and to decode the modified latent vector.

11. An apparatus for processing video data, the apparatus comprising a processor and memory said memory containing instructions executable by said processor whereby said apparatus is operative to:

generate a video frame using received video data;

encode the video frame into a latent vector using an encoder part of a generative model in response to determining a reduction in the generation of video frames using the received video data, wherein the reduction is due to insufficient received video data to generate the video frames, wherein determining the reduction comprises detecting or predicting an inter-time gap between frames displayed on a display being above a threshold using an inter-frame delay prediction model;

modify the latent vector to represent a temporally subsequent new video frame; and decode the modified latent vector using a decoder part of the generative model to generate the new video frame.

12. The apparatus of claim 11, operative to determine a reduction in generating video frames from received video data by: predicting or detecting a predetermined change in a performance metric for a connection used to receive the video data.

13. The apparatus of claim 12, wherein the performance metric is one or more of the following: packet delay; packet variation; bandwidth; received power.

14. The apparatus of claim 11, wherein the inter-frame delay prediction model utilizes a Long Short Term Memory (LSTM) network or a Wavenet architecture.

15. The apparatus of claim 11, wherein the generative model is a variational autoencoder (VAE).

16. The apparatus of claim 11, operative to: receive a pretrained generative model; train the generative model using a sequence of video frames; and/or receive weight data to update the generative model.

17. The apparatus of claim 11, operative to modify the latent vector by moving a position corresponding to the latent vector in a latent space by a step for one or more new video frames.

18. The apparatus of claim 17, wherein the size and/or direction of the step is dependent on one or more of the following: the rate of change in a sequence of video frames prior to the reduction in generating the video frames using the received video data; a prediction of future video frames; an application using the video data.

19. The apparatus of claim 11, operative to switch from new video frames generated using the decoder part to video frames generated using received video data in response to determining an increase in generating the video frames using the received video data.

20. The apparatus of claim 19, operative to blend the new video frames generated using the decoder part and video frames generated using received video data, with a weight of the video frames generated using received video data in the blending increasing over time.

21. The apparatus of claim 11, operative to display the video frames using one or more of the following applications: video on demand; real-time video; gaming; artificial reality; or augmented reality.

22. An apparatus for processing video data, the apparatus comprising a processor and memory, said memory containing instructions executable by said processor whereby said apparatus is operative to:

receive a video frame from a first device and encode the video frame into a latent vector using an encoder part of a first generative model in response to the first device determining a reduction in generating video frames using received video data, wherein the reduction is due to insufficient received video data to generate the video frames, wherein determining the reduction comprises detecting or predicting an inter-time gap between frames displayed on a display being above a threshold using an inter-frame delay prediction model;

modify the latent vector to represent a temporally subsequent new video frame;

decode the modified latent vector using a decoder part of the first generative model to generate the new video frame; and forward the new video frame to the first device.

23. The apparatus of claim 22, operative to:

receive second generative models from a plurality of devices, the second generative models having respective model weights and an encoder part and a decoder part; and aggregate the model weights to generate the first generative model.

24. The apparatus of claim 23, operative to receive a second generative model from the first device and to generate the first generative model using the second generative model from the first device.

25. The apparatus of claim 22, operative to:

forward the first generative model to a server and receive an updated first generative model from the server; and use the updated first generative model to encode the video frame and to decode the modified latent vector.

* * * * *